United States Patent [19]

Swann

[11] 4,346,907
[45] Aug. 31, 1982

[54] SHOPPING CART WITH AUXILIARY LOAD CARRIER

[76] Inventor: Julian B. Swann, 2951 Riverside Dr., Apt. 510, Ottawa, Ontario, Canada, K1V 8W6

[21] Appl. No.: 133,078

[22] Filed: Mar. 24, 1980

[51] Int. Cl.³ .............................................. B62B 1/04
[52] U.S. Cl. ............................ 280/47.18; 280/47.28; 280/47.29; 280/654
[58] Field of Search ............... 280/47.18, 47.28, 47.29, 280/654, 659, 645, 652, DIG. 3, DIG. 4

[56] References Cited

U.S. PATENT DOCUMENTS

| 1,554,034 | 9/1925 | Richie | 280/DIG. 3 X |
| 2,920,900 | 1/1960 | Best | 280/652 |
| 2,967,060 | 1/1961 | Berlin | 280/652 |
| 3,052,484 | 9/1962 | Huffman et al. | 280/654 |
| 3,207,526 | 9/1965 | Brodeck | 280/652 |
| 3,376,986 | 4/1968 | Farber | 414/446 |
| 3,376,986 | 4/1968 | Farber | 280/47.24 X |
| 3,514,123 | 5/1970 | Injeski | 280/652 |
| 3,640,547 | 2/1972 | Friedman | 280/652 |
| 3,726,536 | 4/1973 | Arino | 280/648 |
| 3,774,929 | 11/1973 | Stanley | 280/DIG. 4 X |
| 3,774,931 | 11/1973 | Stelniceanu | 280/47.24 |

FOREIGN PATENT DOCUMENTS

| 787794 | 6/1968 | Canada . | |
| 976579 | 10/1975 | Canada . | |
| 1077765 | 5/1954 | France | 280/47.18 |

OTHER PUBLICATIONS

Advertising Leaflet of Homeware Industries Limited, Tottenham, Ontario Canada.

*Primary Examiner*—Joseph F. Peters, Jr.
*Assistant Examiner*—Donald W. Underwood
*Attorney, Agent, or Firm*—Beveridge, DeGrandi & Kline

[57] ABSTRACT

The invention is a modification of a known type of shopping cart having a basket which allows the cart to carry loads which will not fit within the basket. The cart is of the type having a collapsible basket the front and back of which have pivoted connections to the bottom and to side ribs which provide a parallelogram type of folding and having wheels at the lower end of the basket back, and a frame including a handle bridging the basket top and legs pivoted to upper rear side portions of the basket, the legs being slidably located by the front bottom of the basket. The invention provides an auxiliary load carrier which can be pivoted into an operative condition, projecting at about a right angle to the legs, when the basket is almost collapsed; the cart can then be used as a standard two-wheel cart for boxes, suitcases and other large loads.

28 Claims, 22 Drawing Figures

SHOPPING CART WITH AUXILIARY LOAD CARRIER

BACKGROUND OF THIS INVENTION

A form of collapsible shopping cart which has become widely used in recent years is a cart of the type having a rectangular, collapsible basket portion including wheels mounted on an axle adjacent the lower edge of the back of the basket, and having a U-shaped frame portion including a handle and legs which legs support the front of the basket when in use. The front and back of the basket are usually of wire lattice, and are connected together by a bottom pivoted to their lower edges and by side ribs (usually wires) pivoted to their side margins, so that the basket can be folded from an open condition to a collapsed condition with the front and back remaining parallel to each other and with the side ribs and bottom providing parallel links between the front and back to give a parallelogram form of folding. The handle of the frame portion straddles the basket, and the legs are pivoted to opposite sides of the basket adjacent the top of the back and have lower portions located by guide members extending from the lower frontal area of the basket, the legs including stop means for supporting the basket front in its open condition. This type of cart will herein be referred to as a cart "of the type described".

Typical carts of this general type are shown in the following patents: Canadian Patent No. 617,909 issued Apr. 11, 1961 to Berlin; U.S. Pat. No. 2,920,900 issued Jan. 12, 1960 to Best; U.S. Pat. No. 2,967,060 issued Jan. 3, 1961 to Berlin; U.S. Pat. No. 3,207,526 issued Sept. 21, 1965 to Brodeck; U.S. Pat. No. 3,514,123 issued May 26, 1970 to Injeski; U.S. Pat. No. 3,640,547 issued Feb. 8, 1972 to Friedman.

Carts of this general type may be made in various sizes. Large carts of this kind may have two additional wheels attached to the lower ends of the legs. All carts of this general mechanical design will be referred to as "shopping carts" herein even if intended to be used for purposes other than shopping.

A feature of many carts of this kind is that when folded the lower ends of the legs serve to raise the wheels clear of the ground so that the cart can be stored in near vertical position without tending to move on its wheels.

Carts of the type described are generally restricted to loads which will fit within the basket. A larger load may be balanced on top of the basket but this gives an unstable arrangement if the load is at all heavy.

The object of this invention is to provide a cart of the type described which, in addition to having the useful feature of the known carts, can also be used to carry large and heavy loads which either will not fit within the basket or which can only be placed therein with difficulty.

Prior Art

The prior art shows two examples of carts of the type described, in which auxiliary means have been added for special purposes.

Firstly, Canadian Patent No. 787794, which issued June 18, 1968 to Farber, shows a cart of this type having an auxiliary carrier suitable for lifting a garbage can. This is a specialized form of carrier not suitable for other loads such as boxes.

Secondly, Canadian Patent No. 976579, which issued Oct. 21, 1975 to Stanley, shows a foldable, auxiliary basket intended to be placed on top of the normal basket when this is open. Obviously, the auxiliary basket is not intended for heavy loads which would make the cart unstable.

SUMMARY OF THE INVENTION

The present invention provides a modification of a shopping cart of the type described which enables this to be converted easily into a hand cart of the kind having two wheels and a load carrier or platform which projects in front of the wheels, normally below the wheel axle, and at about a right angle to the handle part of the cart. With this arrangement, loads such as boxes can be placed on the carrier and carried while resting against the handle part. Hand carts of this kind are well known as such and are useful in that a cart having only a small carrier or "toe piece" can be used to transport large loads, especially loads much wider than the cart. The cart of this invention accordingly can be converted for use in carrying quite large boxes, suitcases, and also items which may fit within the basket but are difficult to place there due to their weight. The cart fully retains its normal usefulness as a shopping cart. Preferred embodiments include the feature of known carts whereby the wheels are raised off the floor when the cart is folded and stored in near vertical position.

More specifically, in accordance with the invention, a shopping cart of the type described is made convertible for large loads by the provision of an auxiliary, foldable load carrier pivotably connected to a first cart portion (which may be either the basket or frame portion) so as to be foldable close to the plane of the basket when the basket is collapsed, and so as to be movable into an operative position when the frame and basket portions are in a folded condition at or near the collapsed condition. In this operative condition, the carrier projects beyond one of the cart portions in a plane close to or below the wheel axle to provide a load carrying surface forming a substantial right angle with the one cart portion and having a clear space above it to allow quite large loads to be placed thereon. The carrier and the second of the cart portions have interengaging means effective when the carrier is in operative condition firstly to hold the portions at the folded condition and secondly to support the carrier. The interengaging means may also serve to inhibit or prevent upward pivoting of the carrier from the operative condition so that the cart can stand upright on a level surface contacted by the wheels and the carrier only.

When the carrier is in the operative condition, the back of the basket is spaced slightly from the frame and the basket and frame portions provide spaced load bearing means supporting the carrier. In addition, where the operative carrier is arranged to project in front of the frame portion, as is preferred, the frame in this position is situated just in front of the wheels to hold a load out of contact with the wheels. The interengaging means may include cam means movable with the carrier and which locate the basket and frame portions slightly apart to the proper spacing as the carrier is pivoted to the operative position.

As mentioned, it is common in known carts of the type described for the legs when folded to raise the wheels from the ground. For purposes of this invention this arrangement may be modified so that the carrier is connected to wheel lifting means operable so that the wheels are lifted off the ground when the basket is collapsed and the carrier is folded (the cart being upright), but the wheel lifting means move to allow the wheels to contact the ground when the carrier is pivoted into the operative condition.

In a preferred embodiment of the invention, the rear of the carrier is connected to the basket by pivot means adjacent the lower end of the basket back, and has a folded condition in which a front part of the carrier is held adjacent to, and is movable with, a basket bottom part which latter part is movable about an axis adjacent to or coincident with the pivot means when the basket moves between collapsed and open conditions. In its operative condition the carrier is spaced away from the bottom part and projects forwardly between the legs of the cart. The interengaging means both support the carrier in this position and also hold the legs spaced from the basket back and situated just in front of the front parts of the wheels.

In this embodiment, retaining means are provided for holding the carrier in the folded condition against the bottom part. The latter part may be the actual bottom of the basket joining the lower edges of the basket front and back; or may be another member connecting the bottom portions of the basket front and back; or may be a part of the basket front which is adjacent the normal basket bottom and accordingly moves about an axis adjacent to or coincident with the pivot means of the carrier. In this embodiment, since the folded carrier moves with the base of the basket, the carrier may act to close an otherwise open basket bottom, and accordingly references herein to the "basket bottom" do not imply that the bottom need be a lattice or like load supporting part although this will normally be the case.

Since the carrier of this embodiment, when folded, moves with the basket bottom part, an extension of the carrier rearwardly beyond the wheel axle may constitute wheel lifting means arranged to contact the ground and to raise the wheels off the ground when the carrier and basket are both folded. Movement of the carrier into the operative condition, or the opening of the basket, with consequent movement of the carrier rear extension, allows the wheels to contact the ground.

Further embodiments will be described in which:

(1) the carrier is pivoted near the base of the basket back, but arranged to pivot towards and away from the basket back; and (2) the carrier is pivoted to the frame and arranged to pivot down in front of the frame.

The invention will further be described with reference to preferred embodiments shown in the accompanying drawings, in which:

FIG. 1 is a side elevation of a prior art shopping cart of a type suitable as the basis of the convertible cart of this invention; FIG. 1 shows the basket in open condition in full lines and in collapsed condition in broken lines;

FIG. 10 is a side view of the same portion of the FIG. 9 embodiment again in converted condition with near side wheel and a portion of the frame removed for illustration, FIG. 15 is a perspective view of the bottom portion of a fourth embodiment of cart in the converted condition.

Figure 1:
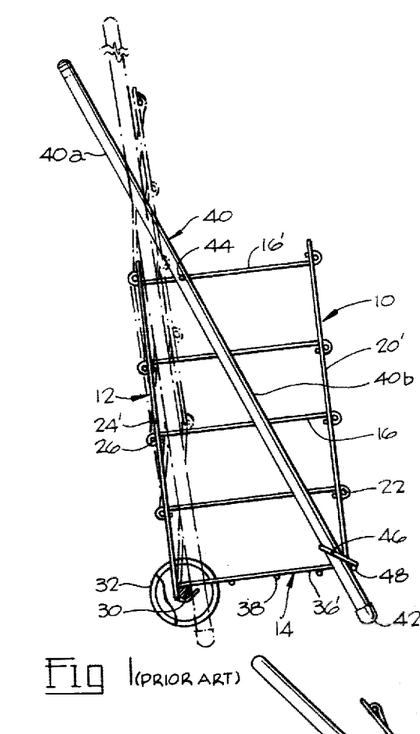
Figures 2, 4:
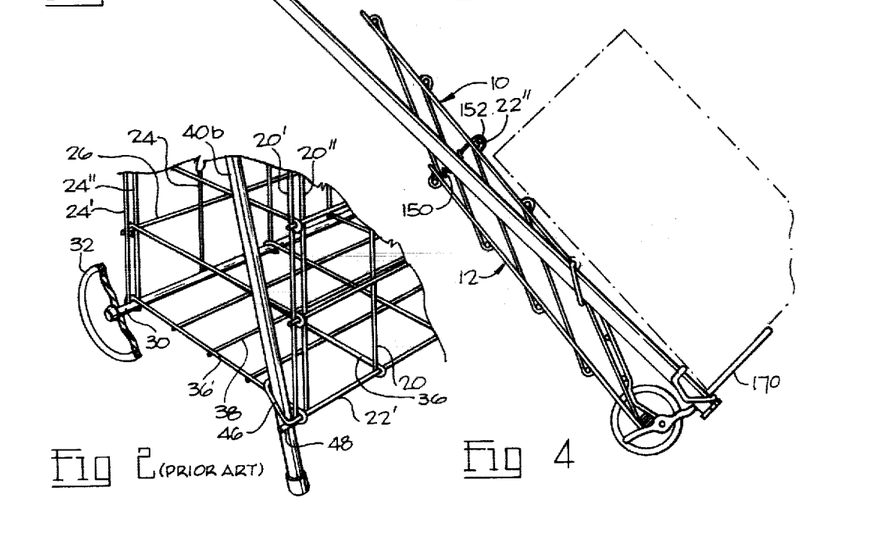
FIG. 2 is a perspective view of the bottom portion of the same prior art cart.
FIG. 4 is a side view of the cart of FIG. 3 when converted into a hand cart for carrying loads such as large boxes.

FIGS. 1 and 2 show a prior art shopping cart; since the structure of this cart provides the basis of the carts of this invention this will be described in detail.

The cart has a collapsible basket with front 10 and back 12 connected together by a lattice bottom 14 and by wire side ribs 16. Throughout the description which follows, references to the front and back of the cart, or "forwardly" or "rearwardly", will be understood as relating to the orientation of the front and back of the basket as indicated.

The front 10 is formed as a wire lattice having vertical wires 20 welded to horizontal wires 22; wire 22' forms the lower edge of the front. The back 12 is similarly formed of vertical wires 24 and horizontal wires 26, and has its lower edge defined by a rod 30 which constitutes axle means for wheels 32 spaced an inch or two from the basket sides.

The side ribs 16 have eyes at their ends which pivotably connect onto the horizontal wires 22, 26 of the front and back, allowing the basket to be folded from an open to a collapsed condition while the front and back remain substantially parallel, the ribs providing a parallelogram type linkage between the front and back. The ribs 16 are located at the sides of the basket by closely spaced pairs of vertical wires 20', 20", 24' and 24" indicated in FIG. 2.

The bottom 14 has fore-and-aft wires 36 welded to lateral wires 38. The wires 36 have eyelets on their ends pivotably engaging front wire 22' and axle rod 30, and the outside wires 36' are also held between vertical wires 20', 20", 24' and 24" to locate the bottom laterally. Bottom 14 pivots in parallel with ribs 16 during folding of the basket.

The cart also includes a frame portion 40 which is a U-shaped tube having an upper handle part 40a which bridges the top of the basket and two legs 40b which closely straddle the basket and which are provided with rubber end caps 42. The legs are pivoted to opposite sides of the basket adjacent the top of the back by pivot pins 44 welded to and projecting outwardly from the rear end portions of upper side ribs 16'. The lower portions of the legs are located by guide members 46 which are looped extensions of horizontal wire 22'. The legs are braced by a connecting rod 48 which also provides stop means supporting the basket front when open. The frame and basket thus constitute foldably connected portions movable from the open condition shown in full lines in FIG. 1 to the collapsed condition indicated in broken lines in that figure. The position of pivot 44 in relation to the geometry of the basket is such that when the cart is folded the lower ends of legs 40b project about 1 inch (2.5 cm) below the bottom of wheels 32 so that the cart can stand upright on its legs with the wheels raised off a floor. Preferably also, the cart in the open condition has a slight backward tilt.

Various means may be used to retain the collapsed basket in the folded condition. For example, a central lateral wire 38 of the bottom may have projecting ends which interfere with legs 40b so that the legs snap past this position in folding of the cart and are thus releasably retained in the folded condition.

Carts of the type described but differing in certain respects may also be used as the basis for the cart of this invention. For example, parts of the basket may be formed of tubes, as shown in the above-mentioned U.S. Pat. Nos. 2,967,060; 3,207,526 and 3,640,547. The front, back and bottom of the basket could even be imperforate and the term "basket" is to be understood as covering such constructions.

Other variations, although they may be used, are preferably avoided at least for the simplest version of the invention, for reasons which will appear. In particular, it is most convenient in simple carts of this invention ion to use fairly small wheels say 5 inches to 6 inches (or say 12 to 15 cm) in diameter; however larger wheels can be accommodated by special constructions as will be described with reference to FIGS. 16 and 17. Also, in many prior art carts the guide members 46 or their equivalent cause the front of the basket bottom to project in front of the adjacent part of the leg when the basket is open and such projection is preferably avoided or at least minimized.

A first embodiment of convertible cart according to the invention will now be described with reference to FIGS. 3 to 8.

This convertible cart uses a basket virtually identical to that of the known cart of FIGS. 1 and 2, and the same references are used for corresponding parts. The only difference in the basket of the convertible cart lies in the position of pivot pins 44 connecting this to its frame 140; in the convertible cart the pins 44 are positioned more forwardly on upper ribs 16' than in the known cart as described, and are positioned so that when the cart s folded (the broken line condition of FIG. 3) the lower ends of legs 140b are just clear of the ground. This could also be achieved by shortening legs 140b and leaving pivot pins 44 in the prior art position but this alternative affects the desirable backwards tilt of the cart.

Figure 3:
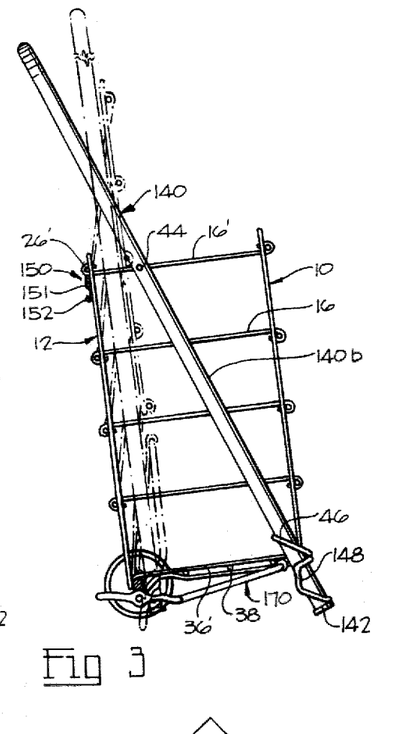
FIG. 3 is a view similar to FIG. 1 of a first embodiment of convertible cart of this invention.

The frame 140 is similar to frame 40 of the prior art cart except that caps 42 are replaced by rubber plugs 142, and the stop means 48 are replaced by a rod member 148 of complex shape which serves the same purpose as stop means 48 and other purposes to be described. Member has a straight central portion 148a which braces the legs and provides a support for the load carrier to be described, for which purpose it is made from strong wire or rod of say ¼ inch (6 mm) diameter. The outer ends of portion 148a rest on the fronts of the lower ends of the legs; the use of plugs 142 rather than caps allows this member to be close to the bottom ends of the legs. Two rod portions 148b extend upwardly, rearwardly from the ends of portion 148a and are welded in grooves in the outer sides of the legs. Portions 148b meet forwardly upwardly sloping portions 148c at corners which project beyond the rear surfaces of the legs to provide detents for retaining the carrier in operative condition as will be described. Portions 148c lead to forwardly extending portions 148d and transversely extending end portions 148e which project sufficiently forwards from the legs to act as stop means for the basket guide members 46 and which are positioned at the same height as stop means 48 of the prior art basket.

With this embodiment, only three components are required additional to the structures so far described.

Figures 5, 7:
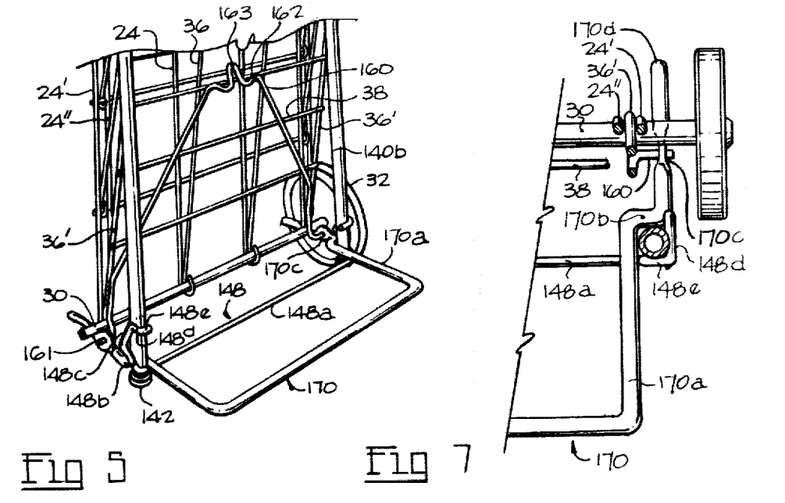
FIG. 5 is a perspective view of the bottom portion of the same converted cart.
FIG. 7 is a plan sectional view on lines VII—VII of FIG. 6.
Figure 6:
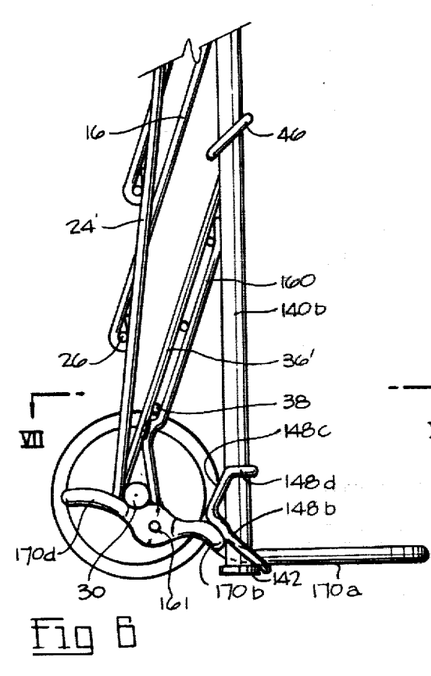
FIG. 6 is a detailed side view of the bottom portion of the same converted cart with near side wheel removed for clarity.
Figure 8:
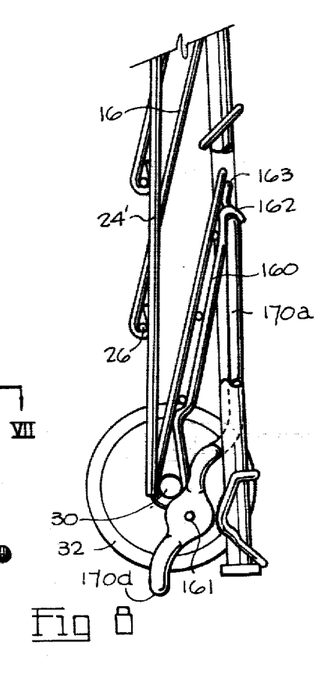
FIG. 8 is a side view similar to FIG. 6 of the same cart when folded; with near side wheel and a portion of the near side of the frame removed for clarity.
Figure 9:
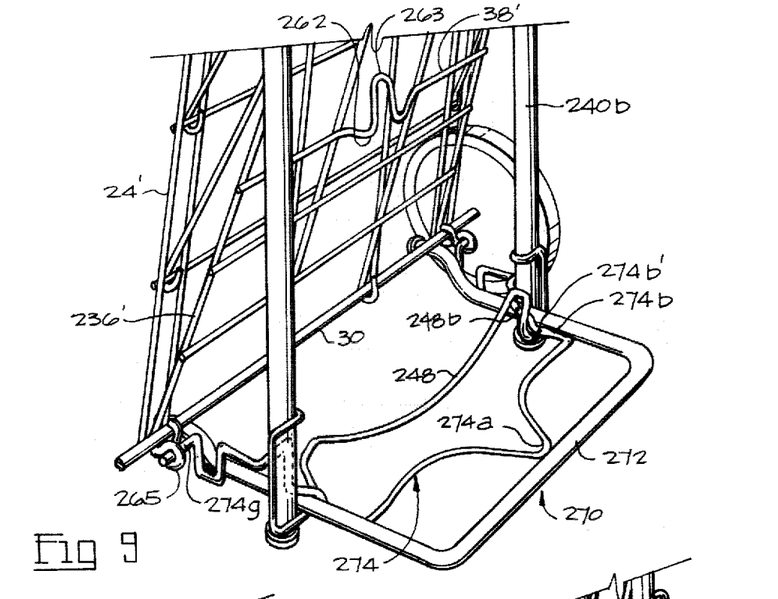
FIG. 9 is a perspective view of the bottom portion of a second embodiment of convertible cart in the converted (load carrying) condition.

Firstly, a spring clip indicated at 150 in FIG. 3 and 4 is required for holding the basket in folded, near collapsed condition. As shown, the clip is mounted on the upper horizontal wire 26' of the basket back, and has a short strong spring 151 terminating in a hook 152 capable of engaging the central horizontal member 22" of the basket front when the cart is either in the collapsed condition (broken line position of FIG. 3) or is in a folded, nearly collapsed condition as shown in FIGS. 4, 5 and 6; in which latter position the spring is under fairly strong tension so that the hook cannot easily be released until the cart is returned to the collapsed condition.

The other two additional components are a bent wire holding member 160 welded to the basket bottom 14, and the carrier 170 which is pivotably supported on outwardly projecting pivot pins provided by the outer ends 161 of member 160. As seen in FIG. 6, the pivot pins 161 lie below and in front of the axle 30, and parts of member 160 adjacent the pins are securely welded to bottom outer side wires 36'. The central part of member 160 includes a formation which provides a releasable catch for the carrier and includes outer loops 162 projecting forwardly, downwardly when the basket is folded (see FIG. 8), and a longer connecting loop 163 extending up above the highest parts of loops 162 in such manner than rearwards pressure on loop 163 tilts the loops 162 outwards from the basket bottom. Preferably loop 163 is arranged so as not to project in front of legs 140 when the carrier is operative as in FIG. 6.

Load carrier 170 is formed of stiff rod, for example ⅜ inch (9 mm) diameter steel rod, and has:

(1) a forward U-shaped portion 170*a* projecting forwardly between legs 140*b* in the operative conditions and having a load carrying surface forming a substantial right angle with the legs and having a clear space above it;

(2) two cam portions 170*b* (best seen in FIG. 7) which extend laterally outwards from the ends of portion 170*a* and which are laterally positioned behind legs 140*b* so as to act on these legs in the manner of cams as the carrier is moved from folded condition (FIG. 8) to operative condition (FIG. 6); and (3) two rear portions each extending rearwardly from portion 170*b* and each including a flattened area 170*c* drilled to receive one of pivot pins 161, and a rearward extension 170*d*.

The carrier is sufficiently flexible to allow it to be mounted on pivot pins 161 by flexing apart the two rear portions.

In side view (FIG. 6) the rear portions of the carrier are formed with a reverse curvature, to achieve several objectives:

(a) The plane of the carrier portion 170*a* is spaced below the plane of pivot pins 161 and is preferably close to the ground when legs 140*b* are vertical (FIG. 6);

(b) the cam portions 170*b* are positioned to be "over centre" relative to the adjacent rear surfaces of legs 140, and are arranged to position the legs so that their front surfaces are in front of the rims of the wheels;

(c) the part of the rear portion just behind flattened area 170*c*, and which has a concave upper surface, contacts axle 30 in the operative condition of the carrier; and (d) the outer extremities of rearward extensions 170*d* are arranged so that in the operative condition of the carrier they lie just in front of the rear extremities of wheels 32; and such that in the folded condition of the carrier (FIG. 8) they project down just below the rims of the wheels and are positioned almost directly below the wheel axle when the cart is vertical, to hold the wheels off the floor.

The above described convertible cart can be used as a normal shopping cart without difficulty. In the collapsed condition, spring clip 150 will be used to hold the parts together in the position shown in FIG. 8. In this position, rear extensions 170*d* of the carrier act to raise the wheels from a floor when the cart is resting in near-vertical position, to facilitate storage. When the cart is to be used in the normal shopping mode, clip 150 is released and the cart opened in conventional manner, into the FIG. 3 condition in which the front member 22' is supported by end portions 148*e* of member 148. In this condition, the holding member 160 has pivoted with the basket bottom moving pins 161 to a position below and rearwards of the wheel axle; this causes rear extensions 170*d* to project behind the wheels. For this reason it may be preferred to form the rear extensions so as to have a curved surface for contacting a step or curb as the cart is pulled upwards.

With the cart initially folded, this can be converted to a hand cart for large or heavy loads simply by releasing the carrier catch by pressing on loop 163, and then pivoting the carrier 170 down to the operative condition where the carrier is supported by rod portion 148*a* while spring clip 150 remains engaged. Cam portions 170*b* initially act to open the legs slightly to the correct folded, near collapsed condition in which the legs hold a load clear of the wheels. In the final stage of movement portions 170*b* pass under the detents formed by portions 148*b* and 148*c*, which, coupled with spring clip 150 urging the legs against portions 170*b*, releasably retains the carrier in the operative condition so that the whole cart can stand by itself on a level floor contacting wheels 32 and the carrier. This retaining mechanism is however capable of being released without damage to the parts if a strong upwards force is applied to the carrier.

In this operative condition of the carrier, rear extensions 170*d* are forward of the rearmost extremities of the wheels, by virtue of the position of pivot pins 161 in front of the axle; thus these do not interfere with the ground in any position of the converted cart.

The carrier is preferably released by pulling the legs away from the basket back against the force of spring clip 150 to release the cam portions 170*b* from the detents formed by rod member 148 while simultaneously raising the carrier at least sufficiently to take portions 170*b* clear of the detents.

In the folded condition of the cart which corresponds to the converted condition (i.e. carrier operative), the frame and back of the cart form a kind of triangulated structure which supports the carrier at spaced points namely rod 148*a* and axle 30; the pins 161 are not subjected to substantial load in this condition.

It will be seen that in its simplest form the convertible cart requires only a few more parts than the conventional cart. This is achieved by making one part perform several functions. For example, rod member 148 provides stop means for supporting the open basket, a support for the operative carrier, a brace between the legs, and a part of the interengaging means for retaining the carrier in the operative condition. The rod forming the carrier additionally provides cam means positioning the legs, and rearward extensions thereof provide wheel lifting means holding the wheels clear of a floor when the cart is folded and stored.

The essential modifications needed to the conventional cart to produce the convertible cart of this invention have been described. However, since the convertible carts are quite likely to carry heavier loads than the conventional carts, it may well be advisable to strengthen the wheels, the axle, and pivot pins 44.

FIGS. 9 to 13 show a second embodiment of convertible cart, generally similar to the first embodiment but having differences in the releasable catch for the carrier, in the pivot connection between carrier and basket, in the carrier itself (and including elimination of the wheel lifting function) and in the means for retaining the carrier in the operative condition. One effect of the latter change is that spring clip 150 is rendered optional.

The releasable carrier catch is here provided by a wire formation similar to that of 162, 163 of the first embodiment and including carrier retaining loops 262 and release loop 263; but here the loops are formed in wire 38' which is an integral cross wire part of the basket bottom.

The carrier pivot mounting is integrated with bottom side wires 236', the normal eye at the ends of these wires being extended to provide a small loop 265 which lies in front of and slightly below axle 30 when the basket is folded but which lies almost directly below the axle when the basket is open.

The carrier 270 of this embodiment is made up of two parts namely a U-tube 272 of similar gauge to that of frame 240, and a wire member 274 of complex shape, and which has outwardly projecting end portions 274g in the form of pivot pins pivotable in loops 265.

Tube 272 has a front, flat, U-shaped load carrying portion 272a arranged to project between legs 240b with a clearance of say ¼ inch on each side, and rearward parts 272b. In side view (FIG. 10) the rearward parts have a reverse curvature similar to that of carrier 170; again the arrangement is such that in the operative condition the tube 272 contacts axle 30 directly so that heavy forces are not transmitted through the wire formation 265. In this case the rear extensions of the carrier, which have rubber end caps 276, are short so that in all the operative conditions of the carrier these rear extensions lie in front of the rearmost rims of wheels 32, i.e. lie within the boundaries of the wheels, and never contact the ground in any condition of the cart. Wire member 274 has a central portion 274a including an arcuate portion welded to the front portion of tube 272 so as to have an upper surface co-planar with the carrier. Extending rearwards from the ends of portion 274a are portions 274b having parts welded to the inner sides of the carrier tube and including loops 274b' projecting slightly below the carrier. From portions 274b the wire curves rearwardly and outwardly at 274c (see FIG. 11) over the sides of the carrier tube and then rises as vertical portions 274d. Portions 274d lead to outwardly looped cam portions 274e which, when the carrier is operative, are just below the level of axle 30 (with the frame vertical) and which locate the legs 240b so that their front surfaces are just forward of wheels 32. Rearward of portions 274e the wire has downward loops 274f welded to the outside of tube parts 272b and which terminate in the outwardly directed pivot pins 274g. The whole wire member 274 is designed to be preformed, clipped into place on tube 272, and welded at the points of contact.

Rod support member 248 of this embodiment is designed to retain the carrier in its operative condition (independent of any clip such as clip 150 described) in addition to the functions of supporting the operative carrier and acting as stop means for the open basket.

Figures 10, 13:
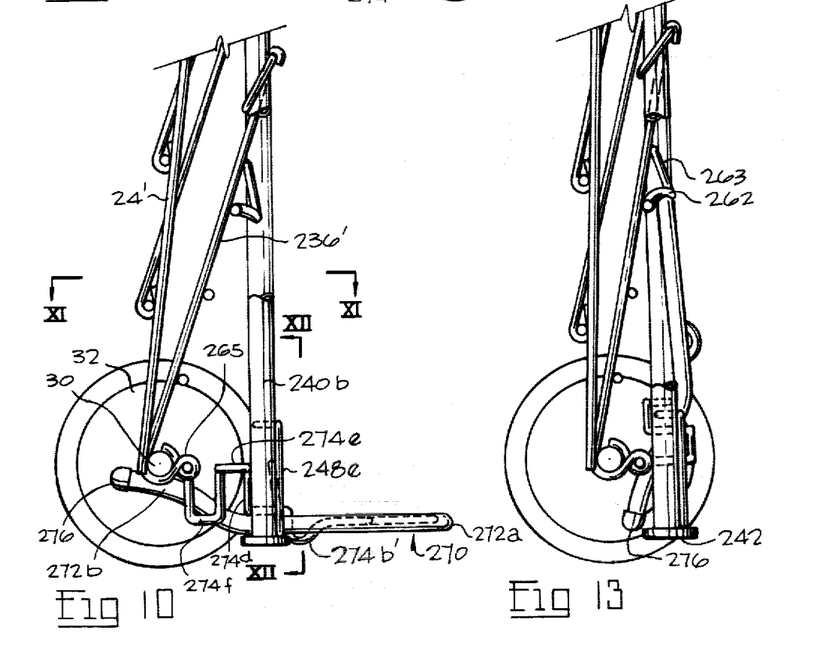

Rod 248 supports the operative carrier on two horizontal portions 248a welded into shallow grooves near the lower ends of legs 240b and extending inwardly from the legs. As seen best in FIG. 12, rod 248 has, inward of portions 248a, curved holding portions 248b which follow the contour of the inner sides of tube 272 until a point near the vertical centre line of the carrier tube sides, where they meet downwardly, outwardly sloping portions 248c which provide a flared entrance into the holding portions 248b. The upper ends of portions 248c are joined together by a central, downwardly bowed portion 248d. With the rod 248 appropriately formed as shown, the carrier can be pushed down into the operative condition with inwards flexing of portions 248b and 248c. The carrier tube may also flex outwardly by such movement but this is limited by interference between pivot pins 274g and loops 265. To prevent interference between rod 248 and wire 274 in approaching the final position, rod portions 248b and 248c are sloped rearwardly from the plane of the legs as indicated in FIG. 10.

Suitably shaped portions 248b,c,d allow the carrier to be releasably retained so that the cart can stand by itself on a level surface, and the carrier can be released smoothly by downwards pressure applied to the centre of portion 248d to flex portions 248b and c inwardly.

Rod member 248 must be strong enough to support the carrier while being flexible enough to bend slightly as described; steel rod of about 5/32" dia. (0.4 cm) is suitable for this purpose in a small cart.

Figure 12:
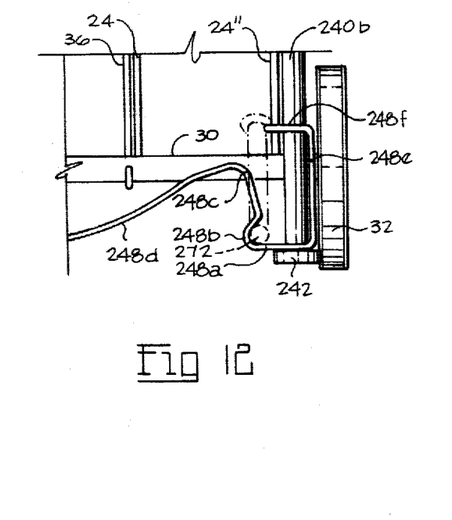
FIG. 12 shows a diagrammatic front sectional view on lines XII—XII of FIG. 10, with the carrier indicated in outline only (in broken lines) for simplicity, FIG. 13 which occurs on the same drawing sheet as FIGS. 9 and 10, shows a view of the second embodiment of cart, similar to FIG. 10, but with the cart folded.
Figure 13:
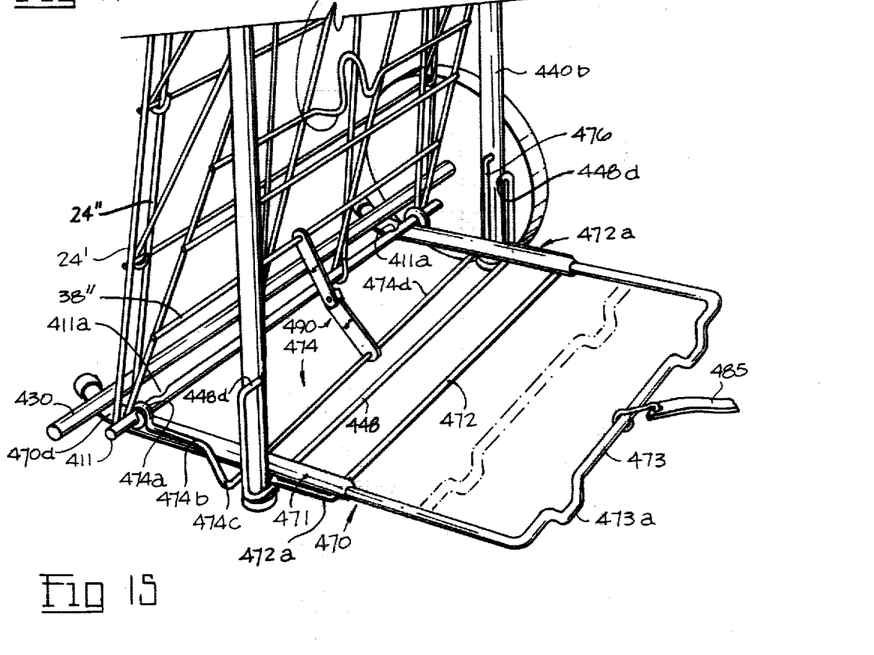

Outwardly of rod portions 248a, the rod member has upwardly extending portions 248e leading to horizontal loops 248f which curve around the insides of the legs at a level suitable for providing stop means for the open basket. The inner extremities of loops 248f are an interference fit with the sides of carrier tube 272, as indicated in FIG. 12. The arrangement is such that in the final phase of folding of the cart, with the carrier already held in place against the basket bottom by catch 262, the legs 240b can be snapped past the position at which portions 248f interfere with the carrier sides, and this interference fit then releasably holds the cart in folded condition.

In order for this embodiment to be readily stored, a brake is provided which inhibits rotation of the wheels when the cart is folded. This brake is provided by plugs 242 in the ends of the legs 240b, these plugs having enlarged, rounded end portions which are in interference fit against the tires of wheels 32. Thus, in the folded condition (FIG. 13) the wheels are prevented from turning and the cart will stand against a wall in stable manner.

Operation of this embodiment is similar to the first except that a spring clip such as item 150 is not essential. From the folded condition, (FIG. 13), the cart will open normally by forcing legs 240b outwardly so that loops 248f snap past the carrier sides. To go from the folded (FIG. 13) condition to the converted (FIG. 10) condition, loop 263 is pressed to release the carrier 270 which is forced down into the operative condition, flexing rod portions 248b, c and d, while the user holds the front and back of the basket substantially together maintaining the legs in contact with cam parts 274e.

Figure 11:
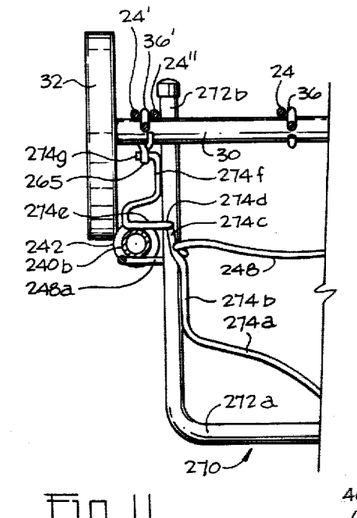
FIG. 11 shows a plan sectional view on lines XI—XI of FIG. 10.

In the final phase of movement the wire portions 274c contact the outer sides of support rod portions 248b, c, and in the operative condition the relationship of these latter parts (as seen in FIG. 11) holds the legs securely against outward movement.

It may still be desirable to use a spring clip (as clip 150) with this embodiment to give more foolproof operation, avoiding the chance of the legs being too far from cam portions 274e for the carrier to engage properly with rod 248.

The carrier can be released easily and smoothly by raising this while depressing the central rod portion 248a to flex portions 248b, c inwardly. However, the construction is such that mere crude force applied upwards on the carrier is sufficient to release this without damage to the parts.

Since the carrier rear extensions do not have any lifting function here, the carrier may be retained against the basket bottom by a spring rather than by means of a catch.

In the first embodiment of cart the wheel lifting means provided by the rear extension 170d of the carrier project rearwardly of the wheels in the basket open condition. This is inevitable where the carrier either pivots on the wheel axle (as is possible although not shown), or pivots on a part solid with the basket bottom with the bottom itself being pivotable on the wheel axle. In such constructions the carrier and basket bottom move as a unit about the wheel axle when the basket is opened. However it is possible to mount the carrier in such manner that a rear extension of the carrier can project below the wheels when the cart is fully folded and upright, and will yet be completely within the boundaries of the wheels (and especially in front of the rearmost parts of the wheels) both when the basket is open and in the converted condition. This may be done by providing a pivot axis solid with the basket back but below and/or in front of the wheel axle, and then either mounting the carrier on this pivot axis, or mounting the basket bottom on this pivot axis and mounting the carrier on the basket bottom. The expression "below and-/or in front" is used herein to refer to a pivot axis location either directly in front of or directly below the wheel axle or intermediate these positions or, more precisely, substantially in the space bounded by planes projecting forwards horizontally and downwards vertically from the wheel axle. FIGS. 14 to 17 show examples of such arrangements.

Figures 14, 16, 17:
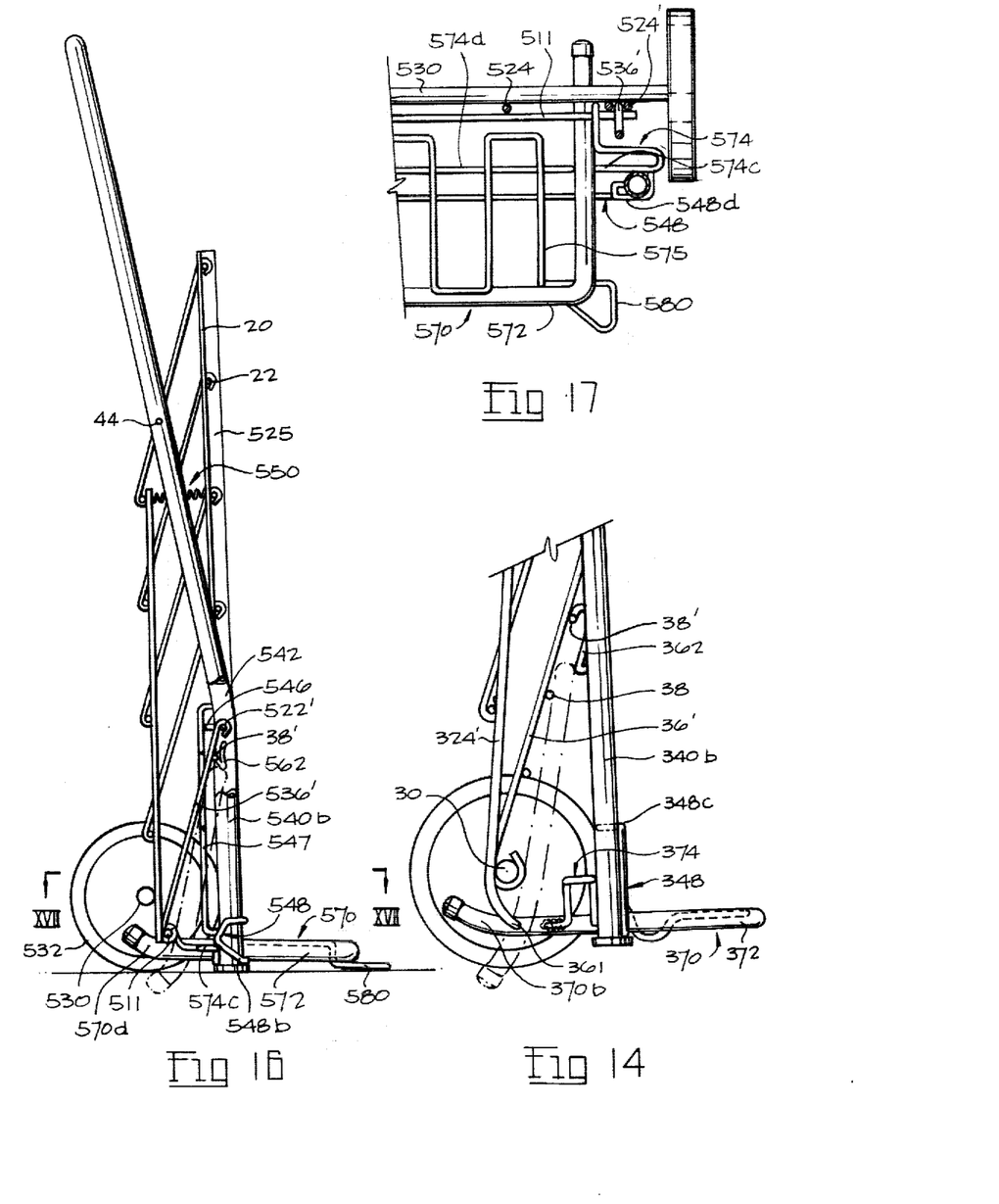
FIG. 14 is a view of a third embodiment of cart, in the converted condition and with the near-side wheel removed.
FIG. 16 is a side view of a fifth embodiment of cart in the converted condition with near side wheel and part of near side of frame removed for illustration.
FIG. 17 is a plan sectional view on lines XVII-XVII of FIG. 16.

FIG. 14 shows one arrangement in which the carrier pivots about a fixed axis (i.e. solid with the basket back) which is below the wheel axle. The carrier 370 is a U-shaped tube having a rear extension 370b provided with lateral bores which receive inturned lower end portions of rods 324' extending below axle 30; rods 324' correspond to wires 24' of the prior art cart but are stronger. The basket bottom includes fore and aft wires 36, 36' and cross wires 38 and is pivotable on axle 30, and as in the second embodiment a wire 38' provides a catch having loop 362 for retaining the carrier when folded. The loop 362 however in this case includes a substantial portion which is parallel to the plane of the bottom and spaced therefrom to provide a sliding fit for the front of carrier tube 370. This is necessary to accommodate relative movement between the carrier and the bottom when the carrier is in folded condition and the basket moves from collapsed to open condition. This also ensures that the carrier cannot be released except when the basket is close to the folded condition.

This FIG. 14 embodiment is otherwise similar to the second embodiment. The rod member 348 is exactly equivalent to rod member 248 of the second embodiment. Wire member 374 is similar to member 274 of the second embodiment except that it does not have any parts corresponding to pivot pins 274g.

In the operative position of the carrier as shown the rear extension of the carrier is within the wheel boundaries; and it is also within these boundaries when the basket is open. In the folded condition of the cart the carrier occupies the position indicated in broken lines and holds the wheels clear of the ground.

As an alternative (not shown), the catch for this carrier may be provided by a downwards extension of the basket front.

FIGS. 15 to 17 show two further embodiments in which the carrier is mounted on a fixed axis below and/or in front of the wheel axle and which also provides the pivot axis for the basket bottom.

Both the fourth embodiment (FIG. 15) and the fifth embodiment (FIGS. 16 and 17) have substantially flat carriers 470 and 570 respectively, pivoted on rods 411, 511 which form the bottom of the basket back. Rods 411 and 511 are below and slightly in front of wheel axles 430, 530 which are welded to the vertical wires 24, 24', 24" of the basket back. The distance separating rods 411, 511 from axles 430, 530 is about 1 to 1¼" inches (about 2.5 to 3.5 cm). In each case the carrier has rear extensions 470d, 570d with end caps, which are within the wheel boundaries when the carrier is operative or when the basket is open, but which project below the wheels to raise these off the ground when the cart is fully folded and upright.

With this pivot arrangement for the carrier, the carrier can be almost flat and yet lie close to the ground in the loading position. One advantage of using a relatively flat carrier is that a major part of this can be made telescopically extendable, as will be described with reference to the FIG. 15 embodiment. Another advantage is that the carrier can be co-planar with the basket bottom and can in fact serve as a closure for the basket bottom as will be described in relation to the embodiment of FIGS. 16 and 17.

Referring to FIG. 15, carrier 470 is designed to carry several suitcases and is made telescopically extendable to give a fore-and-aft dimension greater than can be accommodated within the confines of the basket bottom. The carrier 470 includes two outer, rear tubes 471 braced by rod 472 at a spacing which gives about ½ inch clearance between the carrier and legs 440b at each side, the tubes 471 slidingly receiving the legs of front inner U-tube 473. This front tube has feet 473a allowing the carrier to rest level with the ground for easier loading. In the retracted condition (indicated by broken lines) the carrier is similar in dimensions to that of the second embodiment and when folded is retained by catch 462 again similar to that of the second embodiment.

Rod 472 has end portions 472a extending parallel to and projecting slightly beyond the sides of tubes 471. These portions 472a have an overall width slightly less than the spacing of legs 440b, but cannot pass between ribs 476. These ribs 476 are formed by rods having inturned ends welded to legs 440b and which project inwardly a small amount from the legs, being parallel thereto, extending from near the bottom of the legs to just above basket stop means 448d. This arrangement assists in proper positioning of the legs as the carrier is moved to operative condition, since rod portions 472a can only pass between the legs when the cart is in rear collapsed condition, and similarly the legs cannot move more than a small amount outwardly from the position shown when the carrier is operative.

Carrier 470 also incorporates wire member 474 which is designed to be pre-formed and welded in place on tubes 471. This wire member includes end portions 474a forming hooks pivotably engaging over rod 411 and locating tubes 471 against the bottom of this rod. The rear ends of hooks 474a are spaced above tubes 471, and rod 411 is provided with recesses 411a just inside the normal positions of hooks 474a so that the hooks can be engaged on rod 411 via these recesses by flexing the sides of the carrier inwardly. The hooks 474a normally rest against vertical back wires 24". Wire member 474a also has, inwardly from the ends, portions 474b welded to tubes 471, outward loops 474c serving as cam means to locate legs 440b when the carrier is operative (as in the second embodiment); U-shaped portions welded under tubes 471; and a central portion 474d.

The carrier 470 is supported in operative condition by rod member 448 which extends across the fronts of the bottoms of legs 440b, and which has upper parts 448d projecting forwardly from the legs sufficiently to act as stop means for the basket bottom when open.

This cart is intended to be used with an elastic strap indicated at 485 to hold suitcases in place on the cart as with conventional luggage carriers. Accordingly, positive retaining means are required for retaining the carrier 470 in the operative position as shown even when a strong upwards force is applied to the carrier by strap 485. Suitable retaining means are indicated as provided by a toggle mechanism 490, i.e. a mechanism having two links connected between wire part 474d of the carrier and lowest cross wire 38" of the basket bottom, the links being movable to the over-centre position shown where they slightly deflect members 38" and 474d in holding apart the basket bottom and carrier. The resiliency of wires 38" and 474d is such that the links are maintained in compression even when a heavy load is placed on the carrier.

The carts described above have the possible shortcoming that in the converted mode the basket front is not aligned with the legs, so that the load rests against a non-flat surface (e.g. see FIG. 4). Usually, this will be acceptable, especially if the amount by which the basket front projects is minimized by use of small wheels and by arranging that guide member 46 is at least close to the basket front. However, if desired, the cart may be designed so that in the converted mode the lower parts of the legs against which a load rests are aligned with the basket front. It will be noted that as the basket is opened from the collapsed state, at one position the basket front will be aligned with the front of the wheels. With the normal straight legs of the carts thus far described, the fronts of the legs at this position will be an inch or two in front of the wheels and not aligned with the basket front. To provide a cart with a straight front surface, the legs may be bent at about the point of maximum upward travel of guide member 46 so as to be aligned with the basket front when this is aligned as described and so as to be properly situated just in front of the wheels. Alternatively, the legs may remain straight and totally aligned with the basket front with the pivot for pin 44 being provided in a bracket projecting behind the legs. In either case, the lower leg portions will be substantially aligned with the basket front in the operative condition of the carrier and the pivot 44 will be behind the axes of these lower leg portions.

A cart making use of these principles is shown in FIGS. 16 and 17. These drawings also show a configuration whereby relatively large (say 8 inch dia) wheels may conveniently be used; and in which the carrier provides a closure for the bottom of the basket.

FIG. 16 shows the cart with the carrier in operative condition, in which condition the front of the basket lies in a plane just in front of wheels 532. To provide a smooth surface for contacting a load, the front of the basket is provided with rubber or plastic strips 525 which have grooves in their rear faces fitted on horizontal front wires 22; two or three strips 525 being provided each between a pair of vertical wires 20. The legs 540b are bent slightly at 542 so that the lower parts of these legs lie approximately in the same plane as the fronts of strips 525, while the upper frame part is pivoted to the basket at the usual pivot 44. To maintain the flat front of the cart, the normal guide means 46 are replaced by backwardly bowed extensions 546 of front bottom wire 522' which fit around the rear of legs 540b and which are trapped between legs 540b and guide rods 547 extending parallel to the rear of said legs and welded to the legs at their inturned ends.

The basket bottom here comprises only fore and aft side wires 536' and cross wire 38' similar to that of the second embodiment and which provides the carrier catch 562. In the open basket condition the bottom is closed by carrier 570 which is provided with a wire lattice as shown in FIG. 17. This lattice comprises a wire member 575 of wavy form welded at its front to the upper rearward side of the front of carrier tube 572, and having its rear part supported by portion 574d of a wire which is exactly equivalent to wire 474 of FIG. 15. The upper surface of wire 575 is roughly co-planar with the upper surface of tube 572. Wire 575 has corner extensions 580 projecting under the corners of tube 572 and projecting laterally of the carrier sufficiently so that when the carrier is held by catch 562 and the basket is opened, the extensions 580 will come to rest on stop means 548d equivalent to stop means 448d. Thus, support for the carrier in this condition (in which it carries the weight of articles in the basket) does not depend on the strength of catch 562. The extensions 580 are of course dimensioned to be movable between legs 540b.

The means for retaining the carrier in the operative condition here comprise a formation 548b on carrier support rod 548, this arrangement being equivalent to that described with reference to support rod 148 of the first embodiment. Thus, cam portion 574c of carrier wire 574 locates under the detent formed by wire part 548b when the carrier reaches the operative condition, and the carrier is retained in this condition by a spring clip 550 (equivalent to clip 150 of the first embodiment) until the legs 540b are pulled forward from the basket back or until the carrier is forced upwards.

The cart as shown has a collapsed condition in which the basket front and back are closer together than in the folded condition shown. However, this is not essential and a similar cart may be designed in which the basket parts remain at substantially the same position both when the carrier is operative and when the cart is folded for storage.

As an alternative to the various means for retaining the carrier in the operative condition described above, a resilient retaining member may be provided adjacent the lower end of each leg to receive the adjacent side of the carrier as a friction fit. Such retaining members may, for example, be molded of a resilient plastic and may each include one side portion forming an end cap riveted on to the leg, and an adjacent side portion having an undercut groove in which the side portion of the carrier is a snap fit.

It will be understood that the features of the various embodiments described above may be used in different combinations. For example, the general configuration of the embodiment of FIGS. 16 and 17 may be provided with a regular basket bottom and may have a support rod structure similar to rod 248 of the second embodiment, the wire member 575 being re-designed so as not to interfere with this. The arrangement of co-acting ribs 472a and 476 as shown in FIG. 15 could also be used in an embodiment similar to that of FIG. 16.

Two further embodiments of cart will be described to show that there are alternatives to having the carrier pivoted to fold against the basket bottom, although these latter embodiments are believed less convenient than the embodiments described.

Figure 18:
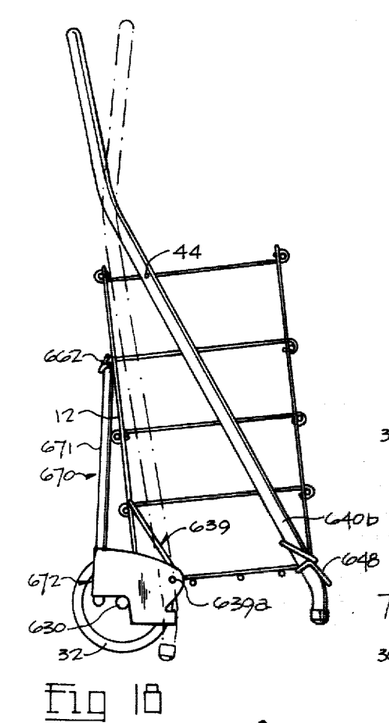
FIG. 18 is a side view of a sixth embodiment of cart in basket open condition.
Figure 19:
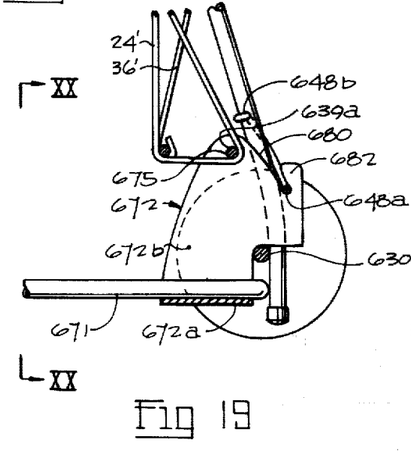
FIG. 19 is an enlarged sectional elevation showing parts of the sixth embodiment cart in converted condition.
Figure 20:
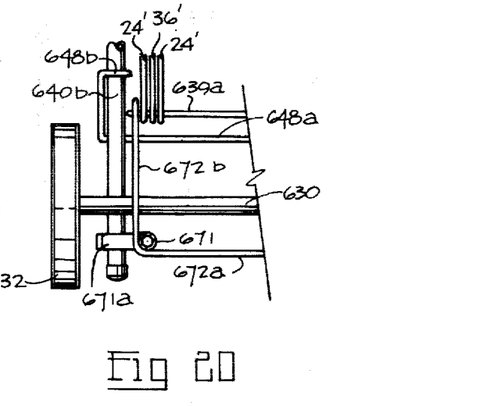
FIG. 20 is a sectional front view of the sixth embodiment of cart on lines XX—XX of FIG. 19.

In the sixth embodiment of FIGS. 18 to 20, the carrier 670 is pivoted on a rod 639a carried by a lower front extension 639 of the basket back, rod 639a being below the range of travel of the basket bottom. As seen in FIG. 18, the carrier folds up against the outside of the basket back 12, being retained by catch 662. The relationship of legs 640b to wheels 32, and the position of pivot pin 44, is the same as that of the prior art cart of FIG. 1 so that the folded legs lift the wheels 32 clear of the ground (see broken line position of FIG. 18). In order for the wheels to contact the ground when the carrier is operative, the wheels are movably mounted relative to the basket back by the axle 630 being carried by a crank component which incorporates the carrier. This component includes carrier tube 671, and a plate member 672 having a flat central part 672a and upturned side flanges 672b, the tube 671 being welded at the junctions of parts 672a and 672b and having outwardly projecting ends 671a. Flanges 672b, shown best in FIG. 19, have bores 675 which are a snap fit on fixed rod 639a, and carry axle 630 in such position that this swings from the FIG. 18 position in which it is near the bottom of the basket back, to the lowered position (FIG. 19) when the carrier is operative.

The flanges 672b also each have a cam surface 680 curving down from above bore 675 (in the FIG. 19 position) to a narrow slot under a hook portion 682. These cam surfaces engage a rod having portion 648a which extends between legs 640b and having upper portions connected to the legs, the latter including parts 648b spaced from the legs to provide stop means for the open basket. Rod portion 648a is spaced slightly in front of legs 640b and is sufficiently resilient to snap into place under hook 682 when the parts reach the FIG. 19 operative position, thus locating the legs when the carrier is operative. As the operative position is approached, carrier tube ends 671a push the legs rearwards providing interference between hook 682 and rod 648a so that this is a snap fit which releasably holds the carrier in operative condition. It will be noted that in this condition wheels 32 are below the lower ends of the legs 640b, and are wholly behind the load supporting surface constituted by basket back 12.

Figure 21:
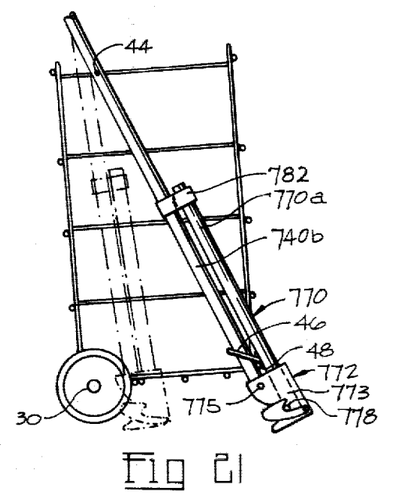
FIG. 21 is a side view of a seventh embodiment of cart showing in full lines the basket open condition and in broken lines the folded condition.
Figure 22:
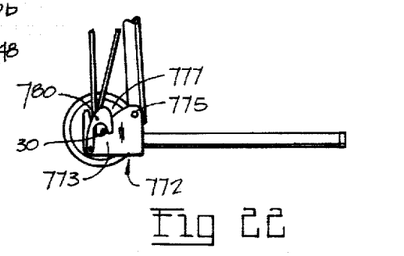
FIG. 22 is a side view of the lower part of the seventh embodiment of cart in converted condition.

FIGS. 21 and 22 represent diagrammatically a further configuration, in which the carrier 770 is pivotably mounted on the lower ends of legs 740b. Although it may seem logical to pivot the carrier to the frame of the prior art basket, since this is the most rigid part, this has the drawback that the space between the legs above the stop means 48 must be left clear for opening of the basket, making it somewhat complicated to provide a carrier spanning the basket width. However, it is a simple matter to provide the kind of carrier shown, and having two load supporting arms 770a connected at their rear ends by plate 772 having end flanges 773. These end flanges are pivoted to legs 740b by pivot pins 775 just below the stop means 48 which are the same as in the FIG. 1 prior art design. Flanges 773 each have a cam surface 777 leading to a recess 778, which recess locates axle 30 relative to the legs in the operative position of the carrier (shown in FIG. 22). A spring clip 780 is provided for retaining the axle in this recess so that the cart is self standing in the converted mode. Engagement of axle 30 against recess 778 also supports the carrier in the operative position.

In the folded position the carrier legs 770a are held by plastic clips 782 fixed to legs 740b. These clips are at a height sufficient not to interfere with sliding of guide members 46 on the legs during folding of the basket. The position of pin 44 is similar to that of the FIG. 1 prior art design so that, with the cart folded, flanges 773 lift the wheels off the ground, as indicated in broken lines FIG. 21. However, since these parts pivot with the carrier, the wheels engage the ground when the carrier has been pivoted to the operative position.

It is possible to provide a carrier, pivotably connected to the legs, and having a supporting portion traversing the front of the cart. This may be done for example by making the carrier as a U-tube the legs of which are stored within legs 40b when the carrier is inoperative, the front portion of the carrier then being under stop means 48. The lower ends of the legs may then have pivotable portions which hold the ends of the carrier legs when pulled out, allowing the carrier to pivot up to its operative position while at the same time effectively shortening the legs so that they do not interfere with the ground. The carrier, while horizontal, may then be slid back into a position in which it is locked and which also locks the axle 30 relative to the basket. However, this construction is complicated to make and operate, and has the drawback that if the carrier is not properly locked in the operative position it may drop its load.

I claim:

1. In a shopping cart of the type having a collapsible basket with a front and a back and with sides formed by ribs which provide a parallelogram linkage connecting the front and the back and allow the basket to be folded from an open to a collapsed condition while the front and back remain substantially parallel, the basket having wheels mounted on axle means extending adjacent the bottom of the basket back, and the cart further comprising a frame including a handle bridging the top of the basket and legs which straddle the basket, the frame being pivoted to opposite sides of the basket adjacent the top of said back and the legs being located by guide members extending from the lower frontal area of the basket so that the frame and basket constitute two foldably connected portions movable from an open condition to a collapsed condition, said legs including stop means for supporting the basket front in said open condition; the improvement comprising an auxiliary, foldable load carrier pivotably mounted on a first of said foldably connected portions, said carrier having a folded condition close to the basket when the basket is collapsed and being movable to an operative condition when said portions are in a folded condition proximate to said collapsed condition, in which operative condition the carrier projects beyond one of said portions in a plane below said axle means to provide a load carrying surface forming a substantial right angle with said one portion and having a clear space thereabove, said carrier and the second of said portions having interengaging means effective when said carrier is in the operative condition firstly to locate the portions at said folded condition, secondly to support the carrier, and thirdly to inhibit upward pivoting of the carrier so that the cart can stand upright on a level surface contacted by the wheels and carrier only.

2. A shopping cart according to claim 1 wherein said interengaging means includes a cam surface arranged to move with the carrier to engage said second foldably connected portion so that movement of said carrier from the folded to the operative condition causes a partial opening of the portions from the collapsed to the folded condition.

3. In a shopping cart of the type having a collapsible basket with a front and a back and with sides formed by ribs which provide a parallelogram linkage connecting the front and the back and allow the basket to be folded from an open to a collapsed condition while the front and back remain substantially parallel, the basket having wheels mounted on axle means extending adjacent the bottom of the basket back, and the cart further comprising a frame including a handle bridging the top of the basket and legs which straddle the basket, the frame being pivoted to opposite sides of the basket adjacent the top of said back and the legs being located by guide members extending from the lower frontal area of the basket so that the frame and basket constitute two foldably connected portions movable from an open condition to a collapsed condition, said legs including stop means for supporting the basket front in said open condition; the improvement comprising an auxiliary, foldable load carrier pivotably mounted on a first of said foldably connected portions, said carrier having a folded condition close to the basket when the basket is collapsed and being movable to an operative condition when said portions are in a folded condition proximate to said collapsed condition, in which operative condition the carrier projects beyond one of said portions in a plane close to said axle means to provide a load carrying surface forming a substantial right angle with said one portion and having a clear space thereabove, said carrier and the second of said portions having interengaging means effective when said carrier is in the operative condition firstly to locate the portions at said folded condition, secondly to support the carrier, and thirdly to inhibit upward pivoting of the carrier so that the cart can stand upright on a level surface contacted by the wheels and carrier only.

4. A shopping cart according to claim 3 wherein said interengaging means includes a cam surface arranged to move with the carrier to engage said second foldably connected portion so that movement of said carrier from the folded to the operative condition causes a partial opening of the portions from the collapsed to the folded condition.

5. A shopping cart according to any one of claims 1, 2, 3 or 4, wherein said one portion is the frame, and wherein with said carrier in its operative condition said interengaging means holds the frame spaced away from the axle means by an amount such that the front of the frame is in front of the frontmost portions of the wheels.

6. A shopping cart according to claim 1 or claim 3, wherein said carrier is movable downwardly from the folded to the operative condition, and wherein said interengaging means which inhibit upward pivoting of the carrier from the operative condition are self-releasing upon excessive upwards force being applied to the carrier.

7. In a shopping cart of the type having a collapsible basket with a front and a back and with sides formed by ribs which provide a parallelogram linkage connecting the front and the back and allow the basket to be folded from an open to a collapsed condition while the front and back remain substantially parallel, the basket having wheels mounted on axle means extending adjacent the bottom of the basket back, and the cart further comprising a frame including a handle bridging the top of the basket and legs which straddle the basket, the frame being pivoted to opposite sides of the basket adjacent the top of said back and the legs being located by guide members extending from the lower frontal area of the basket so that the frame and basket constitute two foldably connected portions movable from an open condition to a collapsed condition, said legs including stop means for supporting the basket front in said open condition; the improvement comprising an auxiliary, foldable load carrier having a rear portion connected to said basket by pivot means adjacent said bottom of the basket back, means for retaining said carrier in a folded condition in which a front part of the carrier is held adjacent to, and is movable with, a basket bottom part which is movable about an axis adjacent to said bottom of the basket back when the basket moves between collapsed and open conditions, the carrier being pivotable downwardly away from said bottom part into an operative condition when said foldably connected portions of the cart are in a folded condition at or near said collapsed condition, in which operative condition the carrier has a load carrying surface projecting between said legs, said carrier and frame having inter-engaging means effective when the carrier is in the operative condition firstly to locate the cart portions in the folded condition in which the fronts of the legs are forward of the front parts of the wheels, and secondly to support the carrier in the operative condition.

8. A shopping cart according to claim 7 wherein said carrier includes a rear extension which projects downwardly below the lower extremities of the wheels when the cart portions are collapsed and when the carrier is folded, so that the cart can stand on said extension when upright.

9. A shopping cart according to claim 8 wherein said pivot means connecting the carrier to said basket are located substantially in the space bounded by planes projecting forward horizontally and downward vertically from said axle means when the carrier is in operative condition.

10. A shopping cart according to claim 9 wherein said pivot means are located so that a portion of said carrier behind the pivot axis contacts said axle means when the carrier is in the operative condition.

11. A shopping cart according to claim 9 or claim 10, wherein said pivot means are carried by and movable with the basket bottom part.

12. A shopping cart according to claim 9 or claim 10, wherein said pivot means are solid with the basket back and co-axial with the pivot axis of the basket bottom.

13. In a shopping cart of the type having a collapsible basket with a front and a back and with sides formed by ribs which provide a parallelogram linkage connecting the front and the back and allow the basket to be folded from an open to a collapsed condition while the front and back remain substantially parallel, the basket having wheels mounted on axle means extending adjacent the bottom of the basket back, and the cart further comprising a frame including a handle bridging the top of the basket and legs which straddle the basket, the frame being pivoted to opposite sides of the basket adjacent the top of said back and the legs being located by guide members extending from the lower frontal area of the basket so that the frame and basket constitute two foldably connected portions movable from an open condition to a collapsed condition, said legs including stop means for supporting the basket front in said open condition; the improvement comprising an auxiliary, foldable load carrier having a rear portion mounted on pivot means carried by the basket back adjacent said bottom thereof, said pivot means being located substantially in the space bounded by planes projecting forward horizontally and downward vertically from said axle means, means for retaining said carrier in a folded condition in which a front part thereof is adjacent a basket bottom part which part is also pivotable about an axis adjacent to said bottom of the basket back, the carrier being pivotable downwardly away from said bottom part into an operative condition when said foldably connected portions of the cart are in a folded condition proximate to said collapsed condition, in which operative condition the carrier has a load carrying surface projecting between said legs, said carrier and frame having interengaging means effective when the carrier is in the operative condition firstly to locate the cart portions in the folded condition and with the fronts of the legs forward of the front parts of the wheels, and secondly to support the carrier in the operative condition, and wherein said carrier has a rear extension which projects below the lowermost parts of the wheels when the carrier is folded and the basket is in collapsed and upright condition, and which is within the boundaries of the wheels both when the carrier is in said operative condition, and when the carrier is retained in said folded condition against the basket bottom part with the basket in open condition.

14. A shopping cart according to claim 7 or claim 13, wherein said interengaging means also include means inhibiting upward pivoting of the carrier from its operative condition so that the cart can stand on a level surface contacted by the wheels and carrier only.

15. A shopping cart according to claim 7 or claim 13 wherein said interengaging means includes cam surfaces extending laterally from the carrier and arranged to contact said legs when the carrier moves to its operative condition and situated so as to hold the fronts of the legs in front of the foremost parts of said wheels.

16. A shopping cart according to claim 7 or claim 13 wherein the carrier is a bent rod having integral formations extending laterally of the carrier and arranged to contact said legs when the carrier moves to its operative condition and situated so as to hold the fronts of the legs in front of the foremost parts of said wheels.

17. A shopping cart according to claim 7 or claim 13 wherein the carrier is in the form of a U-tube combined with a wire member, said wire member having integral formations extending laterally from the carrier and arranged to contact said legs when the carrier moves to its operative condition and situated so as to hold the fronts of the legs in front of the foremost parts of said wheels, said wire member having end portions providing pivot means for the carrier.

18. A shopping cart according to claim 7, wherein said interengaging means includes, in combination, releasable catch means which can be engaged to urge the basket back and frame together when in said folded condition, and a detent on the rear of each of said legs engageable with cam surfaces extending laterally from the carrier and arranged to contact said legs when the carrier is in the operative condition said cam surfaces engaging under said detents to inhibit upward pivoting of the carrier from said operative condition.

19. A shopping cart according to claim 18, wherein said detents are formed by portions of a rod member which also has an intermediate portion extending between said legs and providing support for the carrier in the operative condition.

20. A shopping cart according to claim 7 wherein said inter-engaging means includes a rod member spanning said legs and which supports the carrier in the operative condition, and having holding portions adjacent the inwardly facing sides of the legs and which are formed to embrace and releasably retain forwardly extending portions of said carrier.

21. A shopping cart according to claim 19 or claim 20, wherein outer end portions of said rod member are arranged to form said stop means for supporting the basket front in open condition.

22. A shopping cart according to claim 7 or claim 13, wherein the pivoted connection between the frame and the basket sides is displaced rearwardly of the plane of lower portions of said frame legs so that in said folded condition of the cart said lower portions lie in a plane in front of the foremost parts of the wheels which plane is substantially co-planar with the basket front.

23. A shopping cart according to claim 1, wherein said carrier is pivoted near to the lower edge of the basket back and arranged to pivot from a folded condition against the basket back to an operative condition projecting rearwardly from said back, and wherein wheel lifting means are provided connected to said carrier for raising said wheels relative to said legs when the carrier is in folded condition.

24. A shopping cart according to claim 1, wherein said carrier is pivoted to said frame.

25. A shopping cart according to claim 24, further comprising wheel lifting means constituted by a part pivotable with the carrier which, in the folded condition of the cart and with the carrier in folded condition, and with the cart substantially vertical, extends below the wheels to raise the wheels off a floor surface.

26. A shopping cart according to claim 7 or claim 13, wherein said carrier and said legs have means for preventing pivotal movement of the carrier to the operative condition except when the basket and frame portions are proximate said folded condition.

27. A shopping cart according to claim 1 or claim 3 wherein said carrier is connected to wheel lifting means engageable with a floor to hold the wheels off the floor when the basket is collapsed and the carrier is in folded condition, and with the cart standing upright.

28. A shopping cart according to claim 27 wherein said wheel lifting means are constituted by an extension of said carrier rearward of its pivot mount on said first portion.

* * * * *